US011927224B2

(12) United States Patent
Schaller

(10) Patent No.: US 11,927,224 B2
(45) Date of Patent: Mar. 12, 2024

(54) OSCILLATION DECOUPLING SYSTEM

(71) Applicant: KNORR-BREMSE Systeme fuer Nutzfahrzeuge GmbH, Munich (DE)

(72) Inventor: Sebastian Schaller, Langweid (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 350 days.

(21) Appl. No.: 16/753,639

(22) PCT Filed: Oct. 5, 2018

(86) PCT No.: PCT/EP2018/077104
§ 371 (c)(1),
(2) Date: Apr. 3, 2020

(87) PCT Pub. No.: WO2019/068853
PCT Pub. Date: Apr. 11, 2019

(65) Prior Publication Data
US 2020/0256394 A1   Aug. 13, 2020

(30) Foreign Application Priority Data

Oct. 6, 2017  (DE) ..................... 10 2017 217 845.0

(51) Int. Cl.
  *F16F 15/12*  (2006.01)
  *F16D 1/08*  (2006.01)
  *F16D 3/06*  (2006.01)
(52) U.S. Cl.
  CPC ............. *F16D 1/0894* (2013.01); *F16D 3/06* (2013.01); *F16F 15/1201* (2013.01); *Y10T 74/20006* (2015.01)

(58) Field of Classification Search
  CPC ...... F16D 1/0894; F16D 3/06; F16F 15/1201; Y10T 74/20006
  (Continued)

(56) References Cited

U.S. PATENT DOCUMENTS 1,571,746 A * 2/1926 Wemp .................... F16D 13/68
                                                192/70.17
1,630,199 A * 5/1927 Megnin .................. G05G 25/00
                                                192/109 D (Continued)

FOREIGN PATENT DOCUMENTS

CN         1054122 A       8/1991
CN      103925302 A       7/2014
(Continued)

OTHER PUBLICATIONS

International Search Report (PCT/ISA/210) issued in PCT Application No. PCT/EP2018/077104 dated Feb. 22, 2019 with English translation (four (4) pages).

(Continued)

*Primary Examiner* — Greg Binda
(74) *Attorney, Agent, or Firm* — Crowell & Moring LLP

(57) ABSTRACT

An oscillation decoupling system does not transmit oscillations, for example, from a drive train of a vehicle to an actuator system for a clutch. A clutch system with the oscillation decoupling system has an adjusting element. The actuator system includes an active element which is designed to carry out an active movement in a predetermined working direction and an element of the oscillation decoupling system which connects the active element to the actuator device and to the adjusting element. The element of (Continued)

the oscillation decoupling system includes, in a predetermined direction of work, a play region in which the active element or the adjusting element moves without the respective other moving element.

13 Claims, 3 Drawing Sheets

(58) Field of Classification Search
USPC ............. 464/169; 192/109 R, 109 D; 74/470
See application file for complete search history.

(56) References Cited

U.S. PATENT DOCUMENTS

| | | | |
|---|---|---|---|
| 1,951,288 A | | 3/1934 | Madress et al. |
| 2,468,182 A | | 4/1949 | Dempsey |
| 2,977,777 A | | 4/1961 | Bernitz |
| 4,485,688 A | * | 12/1984 | Muth ................. F16H 61/26 74/470 |
| 4,943,182 A | | 7/1990 | Hoblingre |
| 5,136,893 A | | 8/1992 | Wilhelmy |
| 5,184,920 A | | 2/1993 | Straessle |
| 2002/0173362 A1 | | 11/2002 | Sadakata et al. |

FOREIGN PATENT DOCUMENTS

| | | |
|---|---|---|
| DE | 39 16 569 C1 | 8/1990 |
| DE | 43 20 353 A1 | 1/1994 |
| DE | 10 2010 000 547 A1 | 8/2011 |
| DE | 10 2011 104 370 A1 | 12/2011 |
| DE | 10 2012 024 079 A1 | 7/2013 |
| EP | 1 260 725 A2 | 11/2002 |

OTHER PUBLICATIONS

International Preliminary Report on Patentability (PCT/IB/326 & PCT/IB/373) issued in PCT Application No. PCT/EP2018/077104 dated Apr. 16, 2020, including English translation of document C2 (German-language Written Opinion (PCT/ISA/237) previously filed on Apr. 3, 2020) (eight (8) pages).

Chinese-language Office Action issued in Chinese Application No. 201880065212.4 dated Sep. 13, 2021 with English translation (14 pages).

* cited by examiner

OSCILLATION DECOUPLING SYSTEM

BACKGROUND AND SUMMARY OF THE INVENTION

The invention relates quite generally to an oscillation decoupling system, in particular to an oscillation decoupling system for use in a drive train of a vehicle.

Vehicles are frequently provided with an internal combustion engine which is connected to drive wheels via a drive train. In order to be able to disconnect the internal combustion engine from the drive wheels, for example during stopping of the vehicle, as is known a clutch is provided in the drive train of the vehicle. The clutch, in particular in passenger vehicles, is frequently actuated via a Bowden cable which is connected to a clutch pedal for the driver. By contrast, alternatively installed automatically switching clutches are provided with a special actuating mechanism.

However, during the journey, the drive train is affected by oscillations, namely wobbling, which is transmitted to the clutch. In the case of clutches which are engaged and disengaged with the aid of the special actuating mechanism, this wobbling however has an adverse effect on the actuating mechanism which leads to wear of the latter which, in turn, has a negative effect on components of the clutch.

It is the object on which the invention is based to provide an oscillation decoupling system which prevents transmission of oscillations.

The object is achieved by an oscillation decoupling system as claimed in the independent claims. Advantageous developments are the subject matter of the dependent claims.

According to the invention, an oscillation decoupling member is provided between an adjustment element and an actuating mechanism. Said oscillation decoupling member connects an active element of the actuating mechanism and the adjustment element, wherein the oscillation decoupling member is designed as a connection which is play-afflicted in the predetermined active direction, which means that it has a predetermined play region in which either the active element or the adjustment element moves without the respective other component moving. Oscillations which occur in the adjustment element can therefore be kept away from the actuating mechanism and also oscillations in the actuating mechanism can be kept away from the adjustment element. Although the oscillations are transmitted up to a connecting element of the vibration decoupling member, which connecting element is connected to the adjustment element, they are not transmitted to said connecting element because of a defined play in the connection in an active direction of an active element of the actuating mechanism.

When used for a clutch of a vehicle, the adjustment element contains, for example, a release lever, a pressure plate and a clutch disk, and is advantageously designed to be at least approximately play-free. Defined conditions can thereby be provided in order to carry out clutch operations precisely via the actuating mechanism, and therefore shifting or starting operations proceed frictionlessly.

For this purpose, the adjustment element advantageously has at least one spring element which is designed to eliminate a play in a disengaging and engaging direction in the adjustment element. Freedom from play can thereby be ensured in the adjustment element even in the event of dimensional changes due to wear or thermal expansions.

Advantageously, the active element of the actuating mechanism acts in the actuated state of the actuating mechanism directly on the adjustment element. It is thereby possible to realize the oscillation decoupling member in a cost-effective and operationally reliable manner using simple means.

If, in an advantageous manner, the oscillation decoupling member has a tube either on the adjustment element or the active element, wherein the tube is provided with at least one radial groove which is located in the tube wall and extends axially, and the other element of the adjustment element and the active element has a lug element, wherein the lug element has a lug engaging radially in the groove in a play-afflicted manner in the axial direction, the oscillation decoupling member can transmit both a compressive force and a tensile force while having a simple design.

Alternatively thereto, the oscillation decoupling member advantageously has a tube or a tube-like element with at least one elongated hole extending in the axial direction in the circumferential wall. The tube interior is formed in a complementary manner to the active element of the actuating mechanism or to the connecting element of the oscillation decoupling member, which connecting element is connected to the adjustment element. The oscillation decoupling member furthermore has a radial pin which engages in the elongated hole and interacts therewith in order to transmit a force. This design makes it possible to realize the oscillation decoupling member in a cost-effective and operationally reliable manner using simple means and to permit a transmission of force in both directions.

In an advantageous embodiment having two diametrically opposite elongated holes and the pin, a relatively great force can be transmitted simply and cost-effectively from the actuating mechanism to the adjustment element via the pin and the elongated holes.

The forces can be transmitted simply and cost-effectively when the pin advantageously lies directly or indirectly against one end of the elongated hole or of the elongated holes.

If the oscillation decoupling member is advantageously provided with at least one flange as an alternative or addition to the transmission of force from the pin to the at least one elongated hole, and the at least one flange is designed to transmit a force from the actuating mechanism to the adjustment element even relatively great forces can be transmitted in an operationally reliable manner.

If at least one further spring element is advantageously provided in the oscillation decoupling member, wherein the at least one further spring element is designed to prestress the play-afflicted connection in its active direction, a formation of noise due to a relative movement between the connecting element, connected to the adjustment element, of the oscillation decoupling member and the active element can be prevented.

When at least one damping element is advantageously provided in the oscillation decoupling member, wherein the at least one damping element is designed to damp a movement permitted by the play-afflicted connection, there is the possibility of damping the oscillations occurring in the adjustment element, in order to reduce wear arising there.

If the actuating mechanism advantageously has an electric linear drive as the actuator, precise activation of the actuating mechanism and therefore, when used in a clutch, precise activation of the clutch can be made possible.

If the actuating mechanism is alternatively advantageously provided with a hydraulic cylinder as the actuator, a movement of the hydraulic cylinder that is initiated by a hydraulic actuating member can be converted without having any compression effect on the transmitting medium.

In an alternative advantageous use of a pneumatic cylinder as the actuator, an active force of the actuating mechanism is produced cost-effectively.

In an advantageous manner, the oscillation decoupling system is used in a vehicle, a utility vehicle, a transmission or a clutch, and therefore the oscillations in each case cannot be transmitted.

The invention will now be explained using an exemplary embodiment with reference to the attached drawings.

DETAILED DESCRIPTION OF THE DRAWINGS

Figure 1:
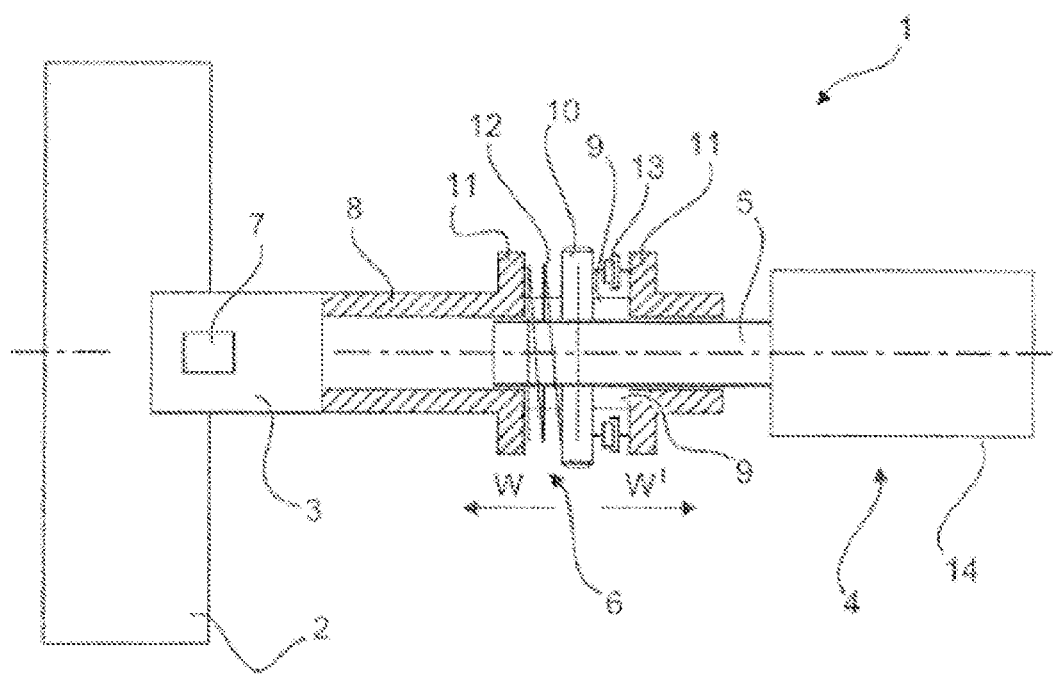
FIG. 1 shows a schematic illustration of a clutch system with an oscillation decoupling system according to the invention.

FIG. 1 schematically illustrates a clutch system for a drive train of a vehicle with an oscillation decoupling system 1 according to the invention.

The clutch system has a clutch 2 for disconnecting and connecting a force flux in the drive train. The clutch system is furthermore provided with a disengaging mechanism for the clutch 2, which serves to engage and disengage the clutch 2, as an adjustment element 3. In addition, the clutch system has a clutch actuating mechanism as the actuating mechanism 4.

The actuating mechanism 4 is provided with an active element 5. The active element 5 is, for example, a recirculating ball spindle of an electric linear unit or a piston rod of a hydraulic or pneumatic cylinder and carries out a first active movement for actuating the adjustment element 3 in a predetermined active direction W and a second active movement in a direction W' counter to the active direction W.

The oscillation decoupling system 1 is furthermore provided with an oscillation decoupling member 6. The oscillation decoupling member 6 connects the active element 5 of the actuating mechanism 4 and the adjustment element 3 for the clutch 2. The oscillation decoupling member 6 is designed as a play-afflicted connection in the predetermined active direction of the actuating mechanism 4. In this connection, play-afflicted means that movements can be carried out within a play region in the active directions W, W' by the adjustment element 3 without said movements being transmitted to the actuating mechanism 4, that it therefore has a predetermined play region in which the active element 5 or the adjustment element 3 moves without the respective other element moving. These movements can be, for example, the oscillations which occur in the drive train, namely the wobbling, but which cannot be transmitted to the actuating mechanism 4 because of the provision of the oscillation decoupling member 6. A dimension of the play region depends on the structural design of the clutch system.

The adjustment element 3 is designed to achieve an approximate, or alternatively complete, freedom from play, and therefore the active movements of the active element 5 of the actuating mechanism 4, which active movements are transmitted in a defined manner via the oscillation decoupling member 6, cause defined states in the clutch 2. It is possible here to exactly control the engaging and disengaging of the clutch 2 for a shifting operation of a transmission, not shown, or for starting.

The adjustment element 3 is provided with at least one first spring element 7, illustrated schematically. It is possible by means of said first spring element 7 to eliminate a play in the adjustment element 3 in a disengaging and engaging direction in order to achieve the abovementioned freedom from play.

In this embodiment, the oscillation decoupling member 6 has a tube 8, shown in a sectional illustration, with two elongated holes 9 in a tube wall in an axial direction of the tube 8. In alternative embodiments, just one elongated hole 9 or more than two elongated holes 9 or else depressions in the form of an elongated hole can also be provided on an inner wall of the tube 8.

The active element 5 is designed in a complementary manner with respect to an interior of the tube 8. The complementary design means here that the active element 5 can be accommodated in the interior of the tube 8 and is optionally guided through the tube 8. Alternatively, the active element 5 is designed as a tube and the connecting element which is connected to the clutch 2 is designed in a complementary manner with respect to the tube. In further alternative embodiments, the oscillation decoupling member 6 does not have a tube, but rather, for example, a linear plain bearing or rolling bearing via which the play is realized in the active direction in the oscillation decoupling member 6.

The active element 5 has a pin 10 which extends radially outward, i.e. transversely with respect to the axial direction, in the active element 5. The pin 10 interacts with the elongated holes 9 by the pin 10 engaging in the elongated holes 9. Outwardly extending flanges 11 are provided at the ends of the elongated holes 9, and therefore the pin lies in the elongated holes 9 against the tube wall and at the same time against the flanges 11 in order to transmit the forces in the active directions W, W' from the actuating mechanism 4 to the disengaging mechanism 3 in order to be able to transmit even relatively large forces in an operationally reliable manner. In alternative embodiments, the elongated holes 9 extend to the axial direction beyond the flanges 11, and therefore the forces are transmitted only via the flanges 11, or no flange 11 is provided at least at one end of the elongated hole, and therefore the forces are not transmitted via the flanges 11, but rather only by the ends of the elongated holes 9.

The oscillation decoupling member 6 is provided with a second spring element 12. The second spring element 12 is designed as a helical spring and is arranged in such a manner that it exerts a spring force between the tube 8 and the pin 10 in one of the active directions W, W' in order to reduce or to eliminate a free play in the oscillation decoupling member 6. For this purpose, the spring element 12 is supported on the flange 11 and the pin 10 and/or on the active element 5. Alternatively, the spring element 12 can also be supported at a different location on the tube 8, and a plurality of spring elements 12 can also be provided which act in opposite active directions W, W'. In further alternative embodiments, the spring element 12 is designed in a different structural form, for example as a disk spring, or there is also no second spring element 12 in the oscillation decoupling member 6.

The oscillation decoupling member 6 is furthermore provided with a damping member 13. The damping member 13 is arranged in such a manner that it exerts a damping effect between the tube 8 and the pin 10 and/or the active element 5 in one of the active directions W, W'. For this purpose, the damping member 13 is supported on the flange 11 and the pin 10. Alternatively, the damping member 13 can also be supported at a different location on the tube 8, and also a plurality of damping members 13 can be provided which act in both active directions W, W' or else in only one direction. In a further alternative embodiment, there is no damping element 13 in the coupling member 6.

The actuating mechanism 4 has, as the actuator 14, an electric linear drive which, driven by a control device, not shown, executes a clutch operation. In alternative embodiments, the actuator 14 can also be designed as a hydraulic cylinder or pneumatic cylinder.

Figure 2:
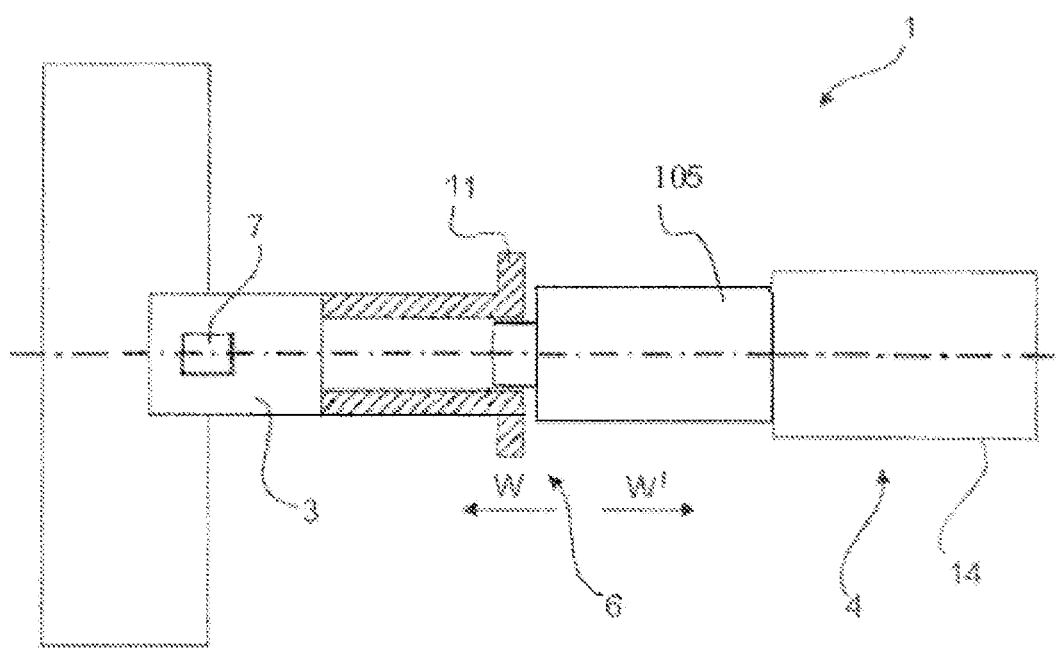
FIG. 2 shows a schematic illustration of a further clutch system with another embodiment of the oscillation decoupling system.

FIG. 2 shows a clutch system having a different embodiment of the oscillation decoupling system 1.

In this embodiment of the oscillation decoupling system 1, the oscillation decoupling member 6 is formed by the active element 205 of the actuating mechanism 4 and a tubular end of the adjustment element 3. As a result, the active element 5 acts directly on the adjustment element 3 when the actuating mechanism 4 is actuated by the actuator 14.

FIG. 2 shows that the active element 205 is provided with a step which is formed in a complementary manner to the tubular end of the adjustment element 3, and therefore the active element 105 is guided in the adjustment element 3 in the active directions W, W'. However, this is not absolutely necessary since it is not obligatory to guide the active element 105 in the adjustment element 3. Alternatively, simple play-afflicted butting of the active element 105 and the adjustment element 3 against each other or a different type of play-afflicted connection is also possible.

Although not illustrated in FIG. 2, even in this embodiment of the oscillation decoupling system 1, the oscillation decoupling member 6 can optionally be provided with the second spring element or the damping member.

The end of the adjustment element 3 is illustrated in FIG. 2 by the flange 11. However, this flange 11 is not absolutely required if a surface for transmitting a force transmitted from the actuating mechanism 4 to the adjustment element 3 is of a sufficient size.

Even in this embodiment of the oscillation decoupling system 1, the adjustment element 3 is optionally provided with the schematically illustrated first spring element 7, by means of which it is possible to eliminate the play in the adjustment element 3 in the disengaging and engaging direction in order to achieve the abovementioned freedom from play.

Figure 3:
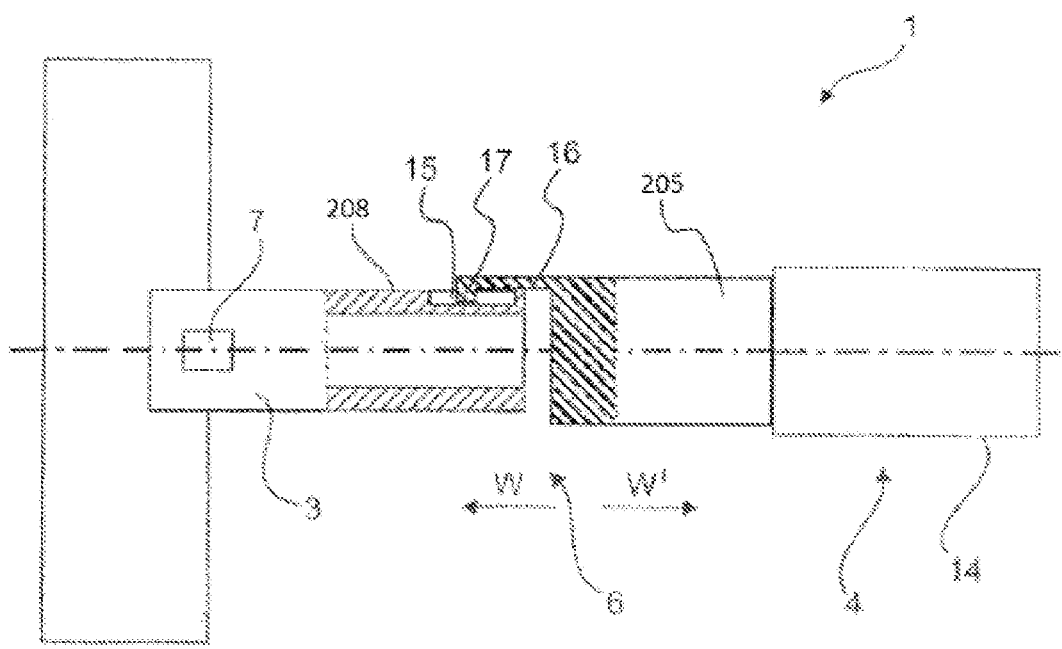
FIG. 3 shows a clutch system with a different formation of the embodiment shown in FIG. 2.

FIG. 3 shows a clutch system with a different formation of the embodiment of the oscillation decoupling system 1 that is shown in FIG. 2.

This oscillation decoupling system 1 differs from the oscillation decoupling system 1 shown in FIG. 2 in that the oscillation decoupling member 6 has a tube 208 on the adjustment element 3, said tube being provided with a radial groove 15 which is located in the tube wall and extends axially. Furthermore, the active element 205 has a lug element 16, wherein the lug element 16 has a lug 17 engaging radially in the groove 15 in a play-afflicted manner in the axial direction. Alternatively, the active element 205 can also have the tube 208 and the adjustment element 3 can be provided with the lug element 16. In a further alternative, at least two grooves 15 are provided with a corresponding number of lug elements 16.

Even in this formation of the embodiment of the oscillation decoupling system 1, the adjustment element 3 is optionally provided with the schematically illustrated first spring element 7, by means of which it is possible to eliminate the play in the adjustment element 3 in the disengaging and engaging direction in order to achieve the abovementioned freedom from play.

Although also not illustrated in FIG. 3, even in this formation of the embodiment of the oscillation decoupling system 1, the oscillation decoupling member 6 can however, optionally be provided with the second element or the damping member.

During operation, the oscillations (the wobbling) in the drive train in a coupled state are decoupled from the actuating mechanism 4 by the play in the oscillation decoupling element 6. As a result, wear which would in turn have a negative effect on the clutch 2 does not occur in the actuating mechanism 4. The oscillation decoupling element 6 is designed and installed in such a manner that the active element 205 oscillates about a zero position in relation to the adjustment element 3 or the tube 208.

During the decoupling, the active element 205 and the adjustment element 3 or the tube 208 move relative to one another until the active element 205 lies directly against the adjustment element 3 or the pin 10 lies directly against the one end of the elongated hole 9 or against one of the flanges 11, or optionally lies thereagainst indirectly via the second spring element 12 and/or the damping member 13, and transmits the force exerted by the actuating mechanism 4 to the adjustment element 3 of the clutch 2. By means of this predetermined relative assignment of the active element 205 and of the adjustment element 3 or the tube 208 in the decoupled state, a defined active movement can be transmitted to the adjustment element 3.

The oscillation decoupling system 1 can also be used in the clutch 2, a transmission, the vehicle or a utility vehicle.

All of the features illustrated in the description, the following claims and the drawing may be essential to the invention both individually and in any desired combination with one another.

LIST OF REFERENCE SIGNS

1 Oscillation decoupling system
2 Clutch
3 Adjustment element
4 Actuating mechanism
5, 105, 205 Active element
6 Oscillation decoupling member
7 Spring element of the adjustment element
8, 208 Tube
9 Elongated hole
10 Pin
11 Flange
12 Spring element of the oscillation decoupling member
13 Damping member
14 Actuator
15 Groove
16 Lug element
17 Lug
W, W' Active direction

What is claimed is:

1. A clutch system comprising:
an oscillation decoupling system, and
a clutch, wherein
the oscillation decoupling system comprises:
an adjustment element;
an actuating mechanism with an active element which is designed to carry out an active movement in a predetermined active direction for actuating the adjustment element; and an oscillation decoupling region across which the active element of the actuating mechanism and the adjustment element interact, wherein the oscillation decoupling region in the predetermined active direction has a predetermined play region in which the active element and the adjustment element are movable without the respective other element moving when the actuating mechanism is not being actuated, the oscillation decoupling region includes a portion of the active element of the actuating mechanism adjacent to the adjustment element, and a portion of the adjustment element adjacent to the actuating mechanism, when the active element acts in the actuated state the active movement is transferred between the active element and the adjustment element in the oscillation decoupling region, and the adjustment element includes a disengaging mechanism for the clutch, which serves to engage and disengage the clutch.

2. The clutch system as claimed in claim 1, wherein the adjustment element has at least one first spring element which is designed to reduce or to eliminate a play in an actuating direction in the adjustment element.

3. The clutch system as claimed in claim 1, wherein the oscillation decoupling region includes a tube either on the adjustment element or the active element, wherein the tube is provided with at least one radial groove which is located in the tube wall and extends axially along a rotation axis of the clutch, and the other element of the adjustment element and the active element has a lug element, wherein the lug element has a lug engaging radially in the groove in a play-afflicted manner in the axial direction.

4. The clutch system as claimed in claim 1, wherein the oscillation decoupling region includes a tube which extends axially along a rotation axis of the clutch, with a radial pin and at least one elongated hole extending axially in the tube wall, an interior of the tube is formed in a complementary manner with respect to the active element or to a connecting element connected to the adjustment element, and the radial pin is provided to engage in the at least one elongated hole and be movable relative to the tube parallel to the clutch rotation axis.

5. The clutch system as claimed in claim 4, wherein the tube has two axially extending and diametrically opposite elongated holes.

6. The clutch system as claimed in claim 5, wherein the elongated hole/the elongated holes and the pin are designed to transmit a force from the actuating mechanism to the adjustment element via the pin lying directly or indirectly against one end of the elongated hole/the elongated holes.

7. The clutch system as claimed in claim 4, wherein the oscillation decoupling region includes at least one flange, and the at least one flange is designed to transmit a force from the actuating mechanism to the adjustment element via the pin lying directly or indirectly against the at least one flange.

8. The clutch system as claimed in claim 1, wherein at least one second spring element is provided in the oscillation decoupling member, and the at least one second spring element is designed to prestress the play-afflicted connection in the predetermined active direction.

9. The clutch system as claimed in claim 1, wherein at least one damping element is provided in the oscillation decoupling region, and the at least one damping element is designed to damp a movement permitted by the play-afflicted connection.

10. The clutch system as claimed in claim 1, wherein an actuator of the actuating mechanism is an electric linear drive.

11. The clutch system as claimed in claim 1, wherein an actuator of the actuating mechanism is a hydraulic cylinder.

12. The clutch system as claimed in claim 1, wherein an actuator of the actuating mechanism is a pneumatic cylinder.

13. The clutch system as claimed in claim 1, wherein the oscillation decoupling system is designed to be used
in a utility vehicle,
in a transmission, and/or
in a clutch.

* * * * *